United States Patent [19]

Downing et al.

[11] 4,246,677

[45] Jan. 27, 1981

[54] CART CASTER

[75] Inventors: Joe R. Downing, Caruthersville, Mo.; Leslie G. Williams, Dyersburg, Tenn.

[73] Assignee: The Colson Company, Caruthersville, Mo.

[21] Appl. No.: 38,572

[22] Filed: May 14, 1979

[51] Int. Cl.³ .............................................. B60B 33/00
[52] U.S. Cl. ..................................................... 16/35 R
[58] Field of Search .................. 16/18 R, 23, 28, 35 R, 16/35 D

[56] References Cited

U.S. PATENT DOCUMENTS

| 1,896,234 | 2/1933 | Hathorn | 16/35 D X |
| 2,481,948 | 9/1949 | Pruitt | 16/35 R X |
| 2,525,362 | 10/1950 | Levy | 16/35 D X |
| 2,634,986 | 4/1953 | McDaniel | 16/35 D X |
| 3,075,233 | 1/1963 | Lorenz | 16/35 D |
| 3,924,292 | 12/1975 | Christensen | 16/35 R X |
| 4,028,773 | 6/1977 | Morgan | 16/35 R |

FOREIGN PATENT DOCUMENTS 607958 12/1978 Switzerland .............................. 16/35 R Primary Examiner—Wm. Carter Reynolds
Attorney, Agent, or Firm—Wegner, Stellman, McCord, Wood & Dalton

[57] ABSTRACT

A cart caster having an improved self-centering structure for causing the caster wheel to have a preselected alignment when elevated from a subjacent support surface. The self-aligning structure includes a cam, a cam follower, and a biasing element cooperatively causing the caster wheel to move to a preselected position about the caster axis when load is removed from the wheel as by lifting of the cart. The aligning structure may include a plurality of alignment portions permitting the wheel to be automatically brought to any one of a plurality of different positions about the caster axis, such as to either a fore or aft direction relative to the cart.

2 Claims, 5 Drawing Figures

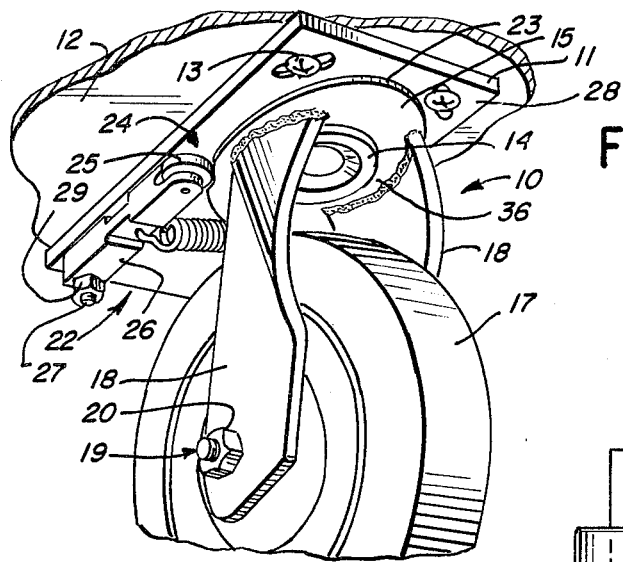
FIG. 1
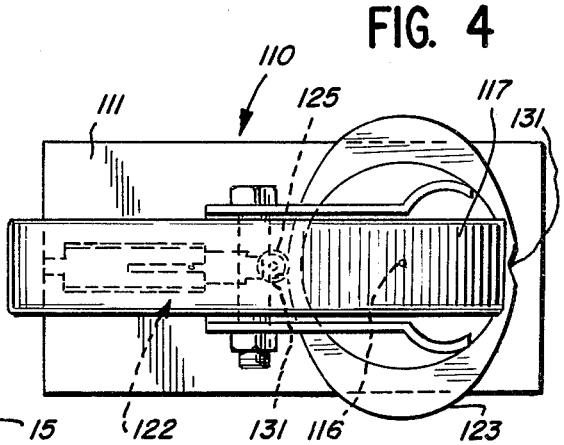
FIG. 4
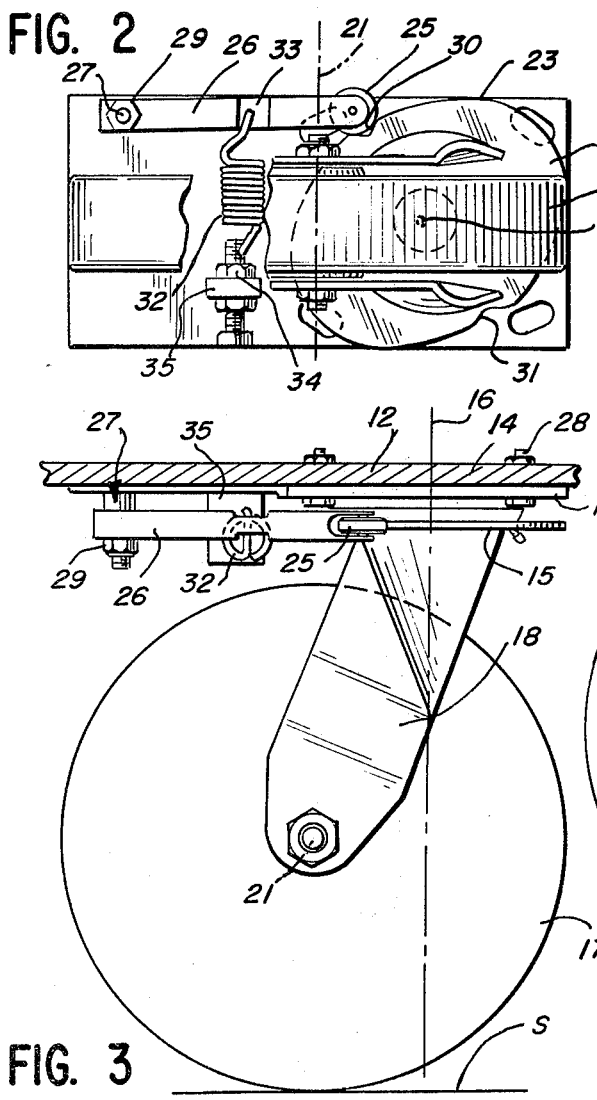
FIG. 2
FIG. 3
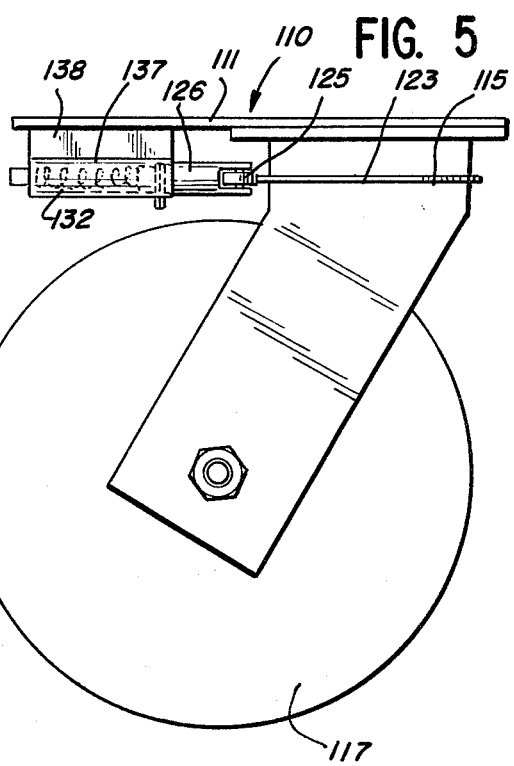
FIG. 5

CART CASTER

BACKGROUND OF THE INVENTION

1. Field of the Invention

This invention relates to cart casters and in particular to cart casters having means for effecting automatic positioning thereof.

2. Description of the Background Art

In one form of cart construction, the wheels thereof are mounted to swivel-type casters, permitting steering of the cart as it is moved over a subjacent ground surface. In certain carts of this type, the cart is at times lifted so as to permit the wheels to be disengaged with the subjacent surface. One such use is in connection with hospital linen carts. It is important that the caster wheels do not extend outwardly from the sides of the cart when so raised so as to avoid hitting walls, door facings, other carts, and the like, as the cart is transported in the elevated condition.

It is further desirable in such carts to provide some means for releasably locking the casters in a fore-and-aft direction for facilitated movement of the cart over the ground surface, while yet permitting ready turning or steering of the cart when desired.

SUMMARY OF THE INVENTION

The present invention comprehends an improved cart caster construction including means for effecting an automatic self-alignment of the caster wheel when the load is removed from the caster wheel as upon lifting of the cart in a lifted transport operation.

More specifically, the present invention comprehends such a cart caster construction including a base plate, a cam plate defining a midportion and having a peripheral rounded camming surface including a centering portion disposed closest to the midportion, and rise portions extending away from the centering portion and progressively further away from the mid-portion, means mounting the cam plate to the base plate for rotation about the midportion, a wheel, a wheel support carried by the cam plate and rotatably mounting the wheel, a cam follower engaging the camming surface, and spring means urging the cam follower against the camming surface to urge the cam plate rotatively about the center portion to a position wherein the cam follower engages the centering portion.

The invention comprehends the provision of such a cart caster construction wherein the camming surface defines a second centering portion substantially diametrically opposite the first centering portion, the spring means urging the cam plate to the closest one of the centering portions.

The cam surface may be generally elliptical with the centering portion being disposed at an end of the minor axis thereof.

The cam follower may comprise a rotor rotatably carried on the carrier with the spring means acting to bias the carrier so as to provide the automatic positioning of the caster wheel.

The spring means may be arranged to act toward the midportion of the cam plate or, alternatively, at an angle to a line from the midportion of the cam plate to the centering position of the camming surface thereof as desired.

The cart caster construction of the present invention is extremely simple and economical while yet providing the highly improved features discussed above.

BRIEF DESCRIPTION OF THE DRAWING

Other features and advantages of the invention will be apparent from the following description taken in connection with the accompanying drawing wherein:

FIG. 1 is a fragmentary perspective view of a cart caster construction embodying the invention;

FIG. 2 is a bottom plat view thereof;

FIG. 3 is a fragmentary side elevation thereof;

FIG. 4 is a bottom plan view of a modified form of cart caster construction embodying the invention; and FIG. 5 is a side elevation of the cart caster construction of FIG. 4.

DESCRIPTION OF THE PREFERRED EMBODIMENTS

In the exemplary embodiment of the invention as disclosed in FIGS. 1-3 of the drawing, a cart caster construction generally designated 10 is shown to include a base, illustratively comprising a base plate 11 which is secured to a support portion 12 of a cart by suitable means, such as screws 13. Swivelly mounted to the base plate by a bearing 14 is a cam plate 15. Base plate 11 is disposed to extend generally horizontally whereby the cam plate 15 is permitted to swing about a vertical caster axis 16 defined by the bearing 14, as shown in FIG. 3.

The caster construction further includes a wheel 17 which is mounted to the cam plate 15 by a pair of spaced supports 18 disposed on opposite sides of the wheel and rotatably carried on an axle 19 having opposite ends projecting through the supports 18 and secured thereto by suitable means, such as screws 20. Thus, as shown in FIG. 2, the wheel 17 is mounted for rotation about a horizontal axis 21 extending transversely to the caster axis 16. Thus, the axle 20 and bearing 14 cooperate in providing a swivel rolling action of the wheel 17 permitting the caster construction to support the cart for movement along a subjacent ground surface S, as shown in FIG. 3, with the wheel being swivelly positionable about the axis 16 to permit steering of the cart as desired.

The invention comprehends the provision in the cart caster construction 10 of improved means generally designated 22 for urging the wheel 17 to a preselected disposition about the caster axis 21. In the embodiment of FIGS. 1-3, the positioning means comprises a camming surface 23 provided on the periphery of the cam plate 15 which is engaged by a cam follower generally designated 24. The cam follower includes, in the illustrated embodiment, a roller 25 carried on one end portion of a carrier 26 swingably mounted to the base plate 11 by a pivot 27, at the opposite end of the carrier 26 with the carrier being retained slidably against the undersurface 28 of the base plate by a suitable screw 29 secured to the lower end of the pivot 27, as best seen in FIG. 1.

As shown in FIG. 3, camming surface 23 defines at least one indent portion 30 for cooperation with the cam follower roller 25 in releasably retaining the cam plate against rotation about axis 16. In the illustrated embodiment, as shown in FIG. 2, the cam surface defines a second indent 31 diametrically opposite indent 30 so as to releasably lock the caster construction in a pair of reversely directed positions.

More specifically, in the illustrated embodiment, camming surface 23 is generally elliptical with the indent portions 30 and 31 being disposed substantially at opposite ends of the minor axis thereof.

Cam follower roller 25 is biased against camming surface 23 by a suitable biasing means, such as spring 32, which may be connected between a midportion 33 of the carrier 26 and an adjustable spring stop generally designated 34 carried on a depending support 35 on base plate 11.

The elliptical characteristic of the camming surface 23 results in different portions thereof being spaced differently from the midportion 36 of cam plate 15. Thus, the camming surface includes centering detent portions disposed closest to midportion 36 and rise portions extending away from the centering portion and progressively further away from the midportion. Resultingly, the force exerted by cam follower roller 25 against the camming surface tends to rotate the cam plate about caster axis 16 to the position wherein the roller cam follower seats in one or the other of the detents 30 or 31 depending on which side of the major axis of the elliptical cam surface is disposed at the time the caster construction is raised from the subjacent surface S to allow the spring biasing means 32 to effect the automatic positioning of the caster wheel.

In the illustrated embodiment, the detent portions 30 and 31 are disposed so as to cause the wheel 17 to extend in a fore-and-aft direction of alignment with the cart when the caster is raised from the surface S. Thus, the cart caster construction permits the cart to be moved selectively in either of its forward or reverse directions with the caster wheel in a conventional following disposition relative to the caster axis 16, with the positioning means 22 serving to bring the caster wheel to the fore-and-aft direction of alignment in either of the forward or reverse direction upon lifting of the cart.

The cooperating cam and cam follower means further serves to act as a releasable lock of the caster in the normal movement of the cart on the subjacent floor surface S as it provides a releasable retention of the cam plate 15 in the aligned fore-and-aft direction while yet permitting ready turning or steering of the cart by permitting ready movement of the cam follower roller 25 from the indent portion when desired.

Referring now to the embodiment of FIGS. 4 and 5, a modified form of cart caster construction generally designated 110 is shown to comprise a cart caster construction generally similar to cart caster construction 10 but utilizing a somewhat modified form of means for biasing the caster wheel 117 to the desired preselected position. As shown, the positioning means generally designated 122 of cart caster construction 110 differs from positioning means 22 in utilizing a compression spring generally designated 132 received within a tubular spring housing 137 inwardly of the carrier 126 carrying the cam follower roller 125 and which thereby positions the carrier 126 longitudinally so as to urge the roller 125 against the camming surface 123 of the cam plate 115. The spring housing may be carried on a suitable support 138 mounted to the base plate 111 of the cart construction so as to align roller 125 with the cam surface, as shown in FIG. 5.

As further illustrated in FIG. 4, the invention comprehends disposing the carrier 126 within the housing 137 in alignment with the caster axis 116 so as to cause cam follower roller 125 to be urged by spring 132 toward the caster axis in its engagement with the camming surface 123. Thus, the indent portions 130 and 131 of the cam surface are aligned with the longitudinal axis of the carrier in the retained disposition illustrated in FIG. 4, whereas in the cart construction 10, the roller 25 is urged chordally to the caster axis 16, i.e. at an angle to a line from axis 16 to the centering portion 30 or 31, requiring that the indent portions 30 and 31 be disposed at an angle to the fore-and-aft direction in the locking disposition, such as shown in FIG. 2.

In all other respects, the cart caster construction 110 is similar to cart caster construction 10 and functions in a similar manner. Elements of cart caster construction 110 similar to corresponding elements of cart caster construction 10 are identified by the same reference numerals but 100 higher.

In each of the embodiments disclosed above, the caster wheel is urged to a preselected position by the improved positioning means of the invention. The positioning means, as discussed above, may include a cam follower urged against a camming surface of the wheel support means so as to urge the wheel support means to the desired preselected disposition when the caster construction is raised from the supporting surface so as to permit the biasing means to freely swing the wheel on the supporting bearing means. As further discussed above, the positioning means serves as a releasable locking means in the normal use of the caster construction in supporting the cart for movement on the subjacent surface S. The caster construction is extremely simple and economical in each of the disclosed embodiments and provides a facilitated operation at a low maintenance cost in the use thereof.

The foregoing disclosure of specific embodiments is illustrative of the broad inventive concepts comprehended by the invention.

We claim:

1. A cart caster comprising:
   a base;
   a generally elliptical plate defining a midportion and having a peripheral elliptical camming surface including a pair of centering portions disposed at opposite ends of the minor axis of the cam plate, and rise portions extending away from each of said centering portions and progressively further away from said midportion to the opposite ends of the major axis of the cam plate;
   means mounting said cam plate to said base for rotation about an axis at said midportion;
   a wheel;
   a pair of wheel supports carried by said cam plate and rotatably mounting said wheel therebetween;
   a cam follower engaging said camming surface; and
   biasing means urging said cam follower against said camming surface to urge said cam plate rotatively about said axis of rotation to a position wherein said cam follower engages a centering portion, said cam follower comprising a carrier having a midportion and opposite end portions, a roller rotatively carried on one end portion of the carrier, and means pivotally mounting the opposite end portion of the carrier to said base, said biasing means comprising a spring acting on said midportion of said carrier to urge said roller against said camming surface at an angle to a line from said axis of rotation to said centering portion of the camming surface thereof.

2. The cart caster of claim 1 wherein each of said centering portions defines a detent in said peripheral camming surface.

* * * * *